(12) United States Patent
Martinez Valdegrama et al.

(10) Patent No.: US 7,722,944 B2
(45) Date of Patent: May 25, 2010

(54) PIECE MADE OF COMPOSITE MATERIAL WITH AREAS OF DIFFERENT THICKNESS

(75) Inventors: Vicente Martinez Valdegrama, Madrid (ES); Oscar De la Cruz Garcia, Madrid (ES); José Luis Lozano Garcia, Madrid (ES); Antonio De Julian Aguado, Madrid (ES); Pedro Nogueroles Viñes, Toledo (ES)

(73) Assignee: Airbus Espana, S.L., Madrid (ES)

( * ) Notice: Subject to any disclaimer, the term of this patent is extended or adjusted under 35 U.S.C. 154(b) by 331 days.

(21) Appl. No.: 12/070,906

(22) Filed: Feb. 21, 2008

(65) Prior Publication Data
US 2009/0162613 A1 Jun. 25, 2009

(30) Foreign Application Priority Data
Dec. 21, 2007 (ES) ............... 200703401

(51) Int. Cl.
*B32B 3/00* (2006.01)
*B32B 7/00* (2006.01)
(52) U.S. Cl. ............. 428/156; 428/60; 428/53; 428/119; 428/120; 428/57
(58) Field of Classification Search .......... 428/33, 428/53, 57, 60, 119, 120, 156; 244/123.1, 244/123.12, 123.8, 124, 123.9
See application file for complete search history.

(56) References Cited
U.S. PATENT DOCUMENTS
7,238,409 B1 * 7/2007 Peterson et al. ........... 428/156
* cited by examiner

*Primary Examiner*—David R Sample
*Assistant Examiner*—Catherine Simone
(74) *Attorney, Agent, or Firm*—Ladas and Parry LLP

(57) ABSTRACT

The invention relates to a piece made of composite material with areas of different thickness manufactured from a stack of composite material fabrics comprising at least two adjacent areas (11, 15) of different thickness and a transition area (13) between both configured with a single slope (17), in which the stack is structured by: a first and a fourth section formed by at least two continuous fabrics (21, 21'; 29, 29') extending along the three mentioned areas (11, 13, 15); a second section formed by one or more symmetrical and balanced fabric packets (23) ending in the transition area (13) placed among one or more continuous fabrics (25); a third section formed by a symmetrical and balanced fabric packet (27) extending along the three mentioned areas (11, 13, 15) placed among one or more continuous fabrics (25).

15 Claims, 2 Drawing Sheets

PIECE MADE OF COMPOSITE MATERIAL WITH AREAS OF DIFFERENT THICKNESS

FIELD OF THE INVENTION

The present invention relates to the stack structure of a piece made of composite material with areas of different thickness manufactured using a heat-forming process and more particularly to the stack structure of a piece with a C-shaped profile with areas of great thickness.

BACKGROUND OF THE INVENTION

Processes for manufacturing pieces basically comprising a first taping step and a second heat-forming step are well known in the aeronautic industry.

Layers of a composite material such as the prepreg, which is a mixture of fibrous reinforcement and polymeric matrix which can be stored, are placed in a suitably shaped mold/jig in the taping step.

This material can be in several forms and particularly in the form of fabric. Resin is generally partially cured or is taken to a controlled viscosity by means of another process called B-step for thermosetting matrices.

The composite material fabrics are not placed randomly, but rather they are arranged in each area in a number and with an orientation of their fibrous reinforcement, typically carbon fiber, determined according to the nature and magnitude of the stresses which the piece will support in each area.

Each area thus has a typical structure of the arrangement or stack of the fabrics. The difference in thickness between the different areas generates fabric drops, which requires having a fabric model for each piece clearly establishing how it must be arranged on the mold/jig during the stacking process. The final result is a planar laminate with areas of different thickness.

In the second step, a heat-forming process is carried out which basically consists of placing the planar laminate resulting from the first step on a jig or mandrel with suitable geometry and applying heat and vacuum according to a certain cycle so that said laminate is adapted to the shape of the jig.

By following processes of this type, several C-shaped pieces made of composite material have been manufactured in the aeronautic industry such as torsion box spars and ribs of horizontal stabilizers for airplanes, provided that the differences in thickness between adjacent areas are not very large since otherwise unwanted creases are formed in the radii of the slopes joining these areas.

In the known art, the pieces with large differences in thickness between two adjacent areas, such as for example an airplane wing spar with an area for anchoring the landing gear which must support a large load, are either manufactured from metal or, if they are manufactured with composite materials, metal angle bars were used to join webs and planar skins of composite materials.

The present invention is aimed at solving the problem set forth by the mentioned limitation for manufacturing pieces made of composite material formed with large differences in thickness between adjacent areas.

SUMMARY OF THE INVENTION

An object of the present invention is to provide a stack structure which allows manufacturing heat-formed pieces made of composite material with a C-shaped profile with large differences in thickness between adjacent areas.

Another object of the present invention is to provide a stack structure which allows preventing creases in the curved parts of adjacent areas with large differences in thickness of heat-formed pieces made of composite material.

These and other objects are achieved by means of pieces manufactured from a stack of composite material fabrics comprising at least two adjacent areas of different thickness and a transition area between both configured with a single slope, the stack structure comprising, from the inner face to the outer face of the piece:

A first section formed by at least two continuous fabrics extending along the three mentioned areas.

A second section formed by one or more symmetrical and balanced fabric packets placed among one or more continuous fabrics extending along the three mentioned areas, said fabric packets extending along the thickest area and ending in the transition area such that the latter has a continuous slope.

A third section formed by a symmetrical and balanced fabric packet extending along the three mentioned areas placed among one or more continuous fabrics extending along the three mentioned areas.

A fourth section formed by at least two continuous fabrics extending along the three mentioned areas.

Other features and advantages of the present invention will be inferred from the following detailed description of an illustrative embodiment of its object in relation to the attached figures.

DETAILED DESCRIPTION OF THE INVENTION

Figure 1:
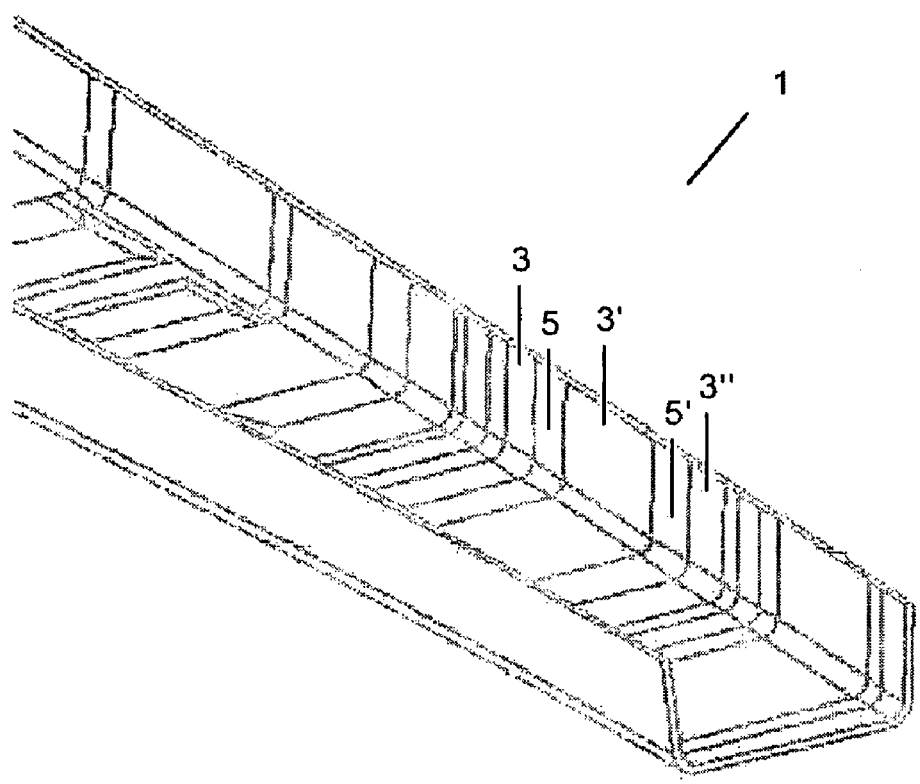
FIG. 1 is a schematic perspective view of a spar with a C-shaped profile with areas of different thickness.
Figure 2:
FIG. 2 is a schematic cross-sectional view of the spar of FIG. 1.

The present invention can be applied to a piece with a C-shaped profile, such as the spar 1, having areas 3, 3', 3" with a large difference in thickness between them determining the existence of slopes 5, 5' in the transition areas between them.

In the manufacture of these types of pieces made of composite material by means of heat-forming processes from planar laminates made with a conventional stack structure, following the typical fabric models with drops in the areas in which jumps in thickness occur, when the differences in thickness between the areas 3, 3', 3" exceed certain limits, creases 7 occur in the curved parts 9 of the slopes 5, 5', making it unviable.

In order to make the manufacture of these types of pieces viable and consequently satisfy a demand in the aeronautic industry which is increasingly aimed at the massive use of composite materials, the inventors have found a stack structure preventing the formation of said creases and described below in two embodiments of the invention.

Figure 3:
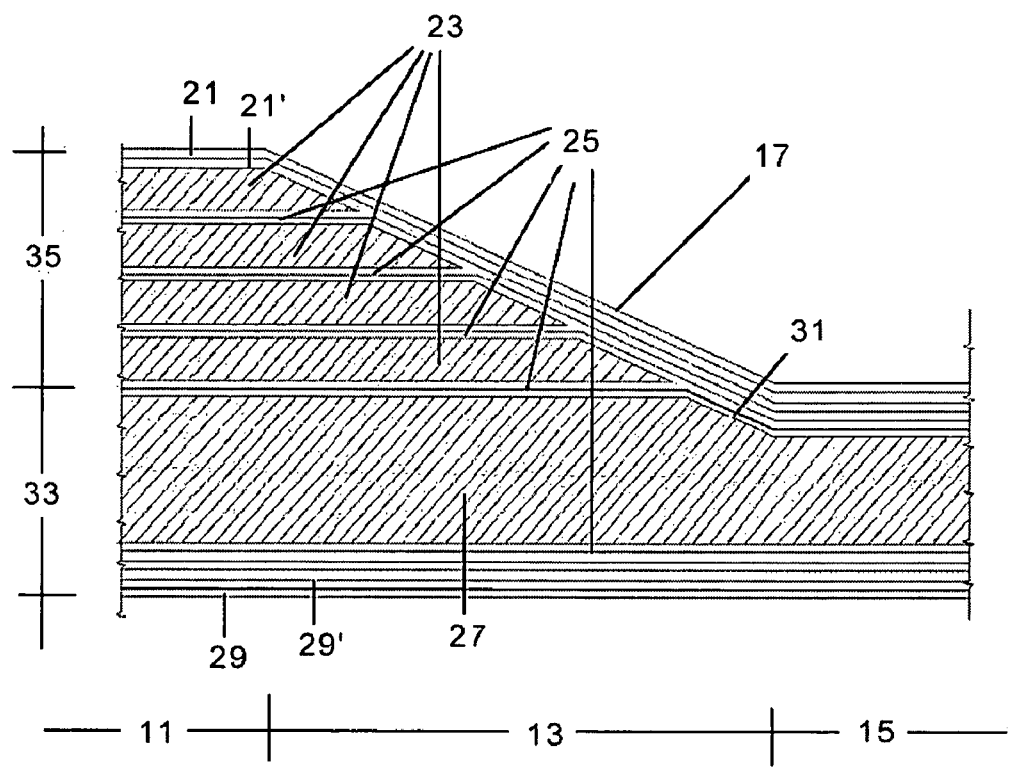
FIG. 3 is a cross-sectional view of a stack structure according to a first embodiment of the present invention.

According to the embodiment shown in FIG. 3, the stack structure can be observed in the part of a piece between two adjacent areas 11, 15 of different thickness with a transition area 13 between both with a continuous slope 17.

The existence of a single slope 17 in the transition area 13 facilitates the definition and execution of the jig necessary for heat-forming of the piece and of the jig necessary for the definitive curing.

From its inner face (through which the jig used during the heat-forming process will be supported) to its outer face, the stack structure comprises the following sections:

A first section formed by at least two continuous fabrics 21, 21' along the three mentioned areas 11, 13, 15.

A second section formed by one or more fabric packets 23 which are symmetrical (i.e. having complete orientation symmetry with respect to the midline of the laminate) and balanced (i.e. having the same number of +45° and −45° layers) placed among one or more continuous fabrics 25 extending along the three mentioned areas 11, 13, 15. Said packets 23 extend along the thickest area 11 and end in the transition area 13 such that the latter has a continuous slope 17. The number of fabrics of the packets 23 depends on the size of the jump in thickness between the area 11 and the area 15 and on the space available for it.

A third section formed by a symmetrical and balanced fabric packet 27 extending along the three mentioned areas 11, 13, 15 placed among one or more continuous fabrics 25 also extending along the three mentioned areas 11, 13, 15. In the embodiment shown in FIG. 3, the fabric packet 27 includes two areas of different thickness determining a slope 31 between them. The maximum limit of the difference in thickness of these two areas of the fabric packet 27 is considered to be 2 mm.

A fourth section formed by at least two continuous fabrics 29, 29' extending along the three mentioned areas 11, 13, 15.

This stack structure combines conventional stack areas 33, which can be referred to as areas with completely alternating fabrics in which the stack is completely symmetrical and balanced, with novel stack areas 35, which can be referred to as areas with partially alternating fabrics in which the packets 23 are internally symmetrical and balanced but which give rise to the compliance of only the balanced condition in the complete laminate, i.e. in the set of the areas 33 and 35.

This stack structure prevents creases since it allows placing the layers most sensitive to the formation of creases within the conventional stack area 33 and the less sensitive layers in the novel stack area 35 either in the fabric packets 23 or in the fabrics 25 surrounding them.

Figure 4:
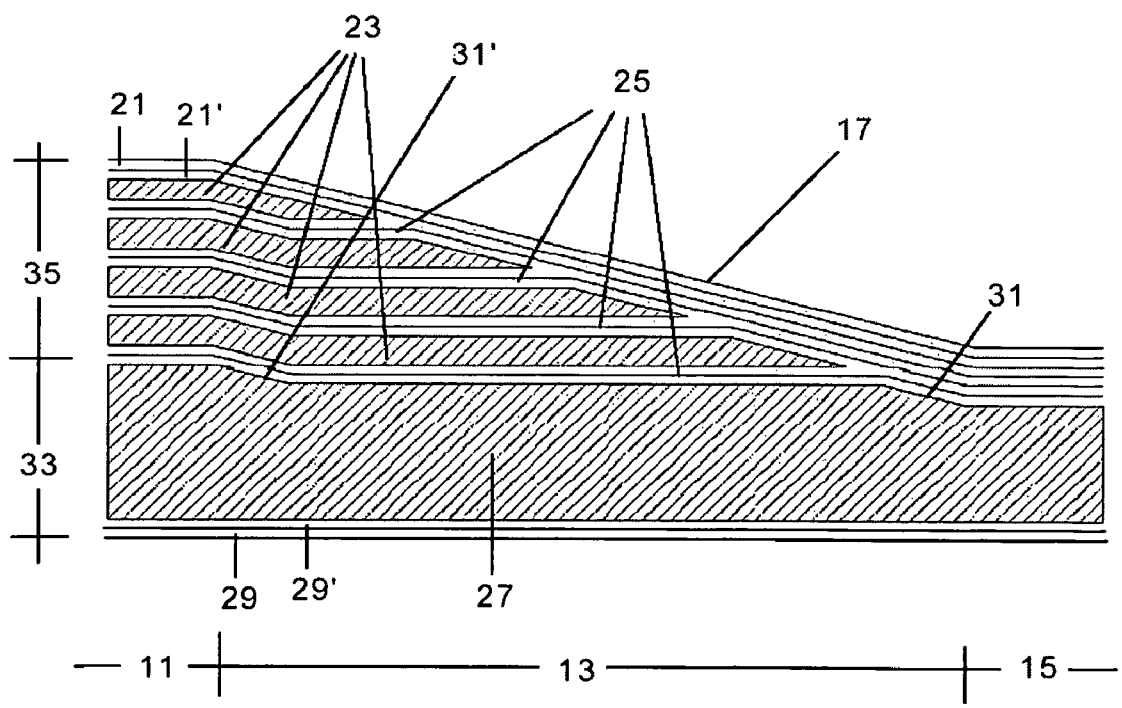
FIG. 4 is a cross-sectional view of a stack structure according to a second embodiment of the present invention.

In the embodiment of the invention shown in FIG. 4, the only difference of the stack structure with that of FIG. 3 is that the formation of the continuous slope 17 of the transition area 13 is obtained by combining two drops 31, 31' of the symmetrical and balanced fabric packet 27 with the drops corresponding to the packets 23 of the partially inserted area 35. The maximum limit of the difference in thickness in the areas of the packet 27 in which the drops 31, 31' occur is 2 mm as in the previous case.

The modifications comprised within the scope defined by the following claims can be introduced in the preferred embodiment which has just been described.

The invention claimed is:

1. A piece (1) manufactured from a stack of composite material fabrics comprising at least two adjacent areas (11, 15) of different thickness and a transition area (13) between both, characterized in that the transition area (13) is configured with a single slope (17) and in that the stack structure, from the inner face to the outer face of the piece (1), comprises:
   a first section formed by at least two continuous fabrics (21, 21') extending along the three mentioned areas (11, 13, 15);
   a second section formed by one or more symmetrical and balanced fabric packets (23) placed among one or more continuous fabrics (25) extending along the three mentioned areas (11, 13, 15), said fabric packets (23) extending along the thickest area (11) and ending in the transition area (13) such that the latter has a continuous slope (17);
   a third section formed by a symmetrical and balanced fabric packet (27) extending along the three mentioned areas (11, 13, 15) placed among one or more continuous fabrics (25) extending along the three mentioned areas (11, 13, 15);
   a fourth section formed by at least two continuous fabrics (29, 29') extending along the three mentioned areas (11, 13, 15).

2. A piece (1) according to claim 1, characterized in that the fabric packet (27) of the third section is configured with a final slope (31) in the transition area forming a section of the slope (17) of the transition area (13).

3. A piece (1) according to claim 2, characterized in that the configuration of the fabric packet (27) of the third section also includes an inner slope (31') in the transition area (13).

4. A piece (1) according to claim 2, characterized in that the jump in thickness corresponding to each of said slopes (31, 31') is less than or equal to 2 mm.

5. A piece (1) according to claim 1, characterized by having a final C-shaped profile and being manufactured from a planar laminate by means of a heat-forming process.

6. A piece (1) according to claim 5, characterized by being an aircraft wing spar with an area of great thickness.

7. A piece (1) according to claim 3, characterized in that the jump in thickness corresponding to each of said slopes (31, 31') is less than or equal to 2 mm.

8. A piece (1) according to claim 2, characterized by having a final C-shaped profile and being manufactured from a planar laminate by means of a heat-forming process.

9. A piece (1) according to claim 3, characterized by having a final C-shaped profile and being manufactured from a planar laminate by means of a heat-forming process.

10. A piece (1) according to claim 4, characterized by having a final C-shaped profile and being manufactured from a planar laminate by means of a heat-forming process.

11. A piece (1) according to claim 7, characterized by having a final C-shaped profile and being manufactured from a planar laminate by means of a heat-forming process.

12. A piece (1) according to claim 8, characterized by being an aircraft wing spar with an area of great thickness.

13. A piece (1) according to claim 9, characterized by being an aircraft wing spar with an area of great thickness.

14. A piece (1) according to claim 10, characterized by being an aircraft wing spar with an area of great thickness.

15. A piece (1) according to claim 11, characterized by being an aircraft wing spar with an area of great thickness.

* * * * *